US008767295B2

(12) United States Patent
Murakami et al.

(10) Patent No.: US 8,767,295 B2
(45) Date of Patent: Jul. 1, 2014

(54) POLARIZING PLATE MANUFACTURING METHOD

(75) Inventors: Ai Murakami, Ibaraki (JP); Takeshi Saito, Ibaraki (JP); Tetsurou Ikeda, Ibaraki (JP); Masayuki Satake, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/320,306

(22) PCT Filed: Sep. 7, 2010

(86) PCT No.: PCT/JP2010/065327
§ 371 (c)(1),
(2), (4) Date: Nov. 14, 2011

(87) PCT Pub. No.: WO2011/030757
PCT Pub. Date: Mar. 17, 2011

(65) Prior Publication Data
US 2012/0057230 A1 Mar. 8, 2012

(30) Foreign Application Priority Data
Sep. 9, 2009 (JP) .................................. 2009-208486

(51) Int. Cl.
G02B 5/30 (2006.01)
(52) U.S. Cl.
USPC .................................................... 359/483.01
(58) Field of Classification Search
USPC ........ 359/483.01, 485.03, 489.11; 156/272.6, 156/306.6, 308.8; 349/96, 122, 138
See application file for complete search history.

(56) References Cited

U.S. PATENT DOCUMENTS

| | | | | |
|---|---|---|---|---|
| 6,512,562 B1 * | 1/2003 | Kobayashi et al. | ........... | 349/122 |
| 2003/0151707 A1 | 8/2003 | Kobayashi et al. | | |
| 2007/0058111 A1 | 3/2007 | Kobayashi et al. | | |
| 2008/0112048 A1 | 5/2008 | Katou et al. | | |

FOREIGN PATENT DOCUMENTS

| | | | |
|---|---|---|---|
| JP | 8-188658 A | 7/1996 | |
| JP | 2000-356714 A | 12/2000 | |
| JP | 2006-195320 A | 7/2006 | |
| JP | 2007-010757 A | 1/2007 | |
| JP | 2007-41563 A | 2/2007 | |
| JP | 2007-279621 A | 10/2007 | |
| JP | 2008-122863 A | 5/2008 | |
| JP | 2008-216910 * | 9/2008 | G02B 5/30 |
| JP | 2008-216910 A | 9/2008 | |
| JP | 2008-249901 A | 10/2008 | |
| JP | 2009-008860 A | 1/2009 | |
| JP | 2009-073911 A | 4/2009 | |
| JP | 2009-139735 A | 6/2009 | |

OTHER PUBLICATIONS

English translation of JP 2008-216910, translated Nov. 2, 2011.*
Notification of Transmittal of Translation of the International Preliminary Report on Patentabililty (Form PCT/IB/338) of International Application No. PCT/JP2010/065327 mailed Apr. 19, 2012 (1 page) with Forms PCT/IB/373 (1 page) and PCT/ISA/237 (4 pages).
Korean Office Action dated Sep. 24, 2012, issued in corresponding Korean Patent Application No. 2011-7021598, (11 pages). With English Translation.
International Search Report of PCT/JP2010/065327, mailing date Oct. 26, 2010.
Chinese Office Action dated May 23, 2013, issued in corresponding Chinese Application No. 201080022257.7 w/English translation.
Taiwanese Office Action dated Jun. 17, 2013, issued in corresponding Taiwanese Application No. 099130306 w/English translation.
Korean Office Action dated Sep. 3, 2013, issued in corresponding Korean Patent Application No. 10-2011-7021598 with English translation (8 pages).
Korean Notice of Rejection dated May 24, 2013, issued in corresponding Korean Patent Application No. 2011-7021598; w/English translation (7 pages).
Japanese Office Action dated Aug. 9, 2013, issued in corresponding Japanese Patent Application No. 2010-192323 with English translation (7 pages).
Japanese Submission of Information dated Dec. 19, 2013, issued in corresponding Japanese Application No. 2010-192323 with English Translation, (9 pages).
Chinese Office Action dated Feb. 13, 2014, issued in corresponding Chinese Patent Application No. 2010800222571, w/English translation (10 pages).
Taiwanese Office Action dated Feb. 14, 2014, issued in Taiwanese Patent Application No. 099130306, w/English translation (7 pages).
Japanese Office Action dated Apr. 18, 2014, issued in Japanese Patent Application No. 2010-192323, w/English translation (6 pages).

* cited by examiner

*Primary Examiner* — James Greece
*Assistant Examiner* — Jie Lei
(74) *Attorney, Agent, or Firm* — Westerman, Hattori, Daniels & Adrian, LLP

(57) ABSTRACT

A method for manufacturing a polarizing plate comprising a polarizing film and a transparent protective film provided on at least one surface of the polarizing film, the method comprising the steps of: subjecting at least a surface of the transparent protective film to be bonded to the polarizing film to an adhesion improving treatment; bringing water into contact with at least the surface subjected to the adhesion improving treatment; and laminating the transparent protective film on the polarizing film so that the surface subjected to the adhesion improving treatment and brought into contact with water is bonded to the polarizing film.

8 Claims, No Drawings

POLARIZING PLATE MANUFACTURING METHOD

TECHNICAL FIELD

The present invention relates to a method for manufacturing a polarizing plate in which a transparent protective film is provided on at least one surface of a polarizing film, and a polarizing plate obtained by the method. The present invention also relates to an optical film including the polarizing plate, and an image display device including the polarizing plate or the optical film.

BACKGROUND ART

As a polarizing plate used for an image display device such as a liquid crystal display device, an electro-luminescent (EL) display device, a plasma display (PD) a field emission display (FED) and the like, generally, a polarizing film including protective films bonded to both surfaces thereof is used.

Examples of the polarizing film include a polarizing film obtained by adsorbing a dichroic material such as iodine, a dichroic dye and the like to a polyvinyl alcohol-based film and further stretch-orientating the film. Examples of the protective film include a stretched product of a polycarbonate-based resin film, a stretched product of a cycloolefin-based resin film, a stretched product of a polyethylene terephthalate-based resin film, a stretched product of a polyimide-based resin film, a triacetylcellulose film or the like.

For example, a polyvinyl alcohol-based adhesive is used for laminating a transparent protective film on the polarizing film. In the lamination process, the surface of the transparent protective film to be bonded to the polarizing film is subjected to an adhesion improving treatment. The following Patent Document 1 discloses a polarizing film, in which a cycloolefin-based resin film subjected to a corona treatment is laminated on a surface of a polarizing film made of a polyvinyl alcohol-based resin with an adhesive layer interposed therebetween, and a cellulose-based resin film subjected to a saponifying treatment is laminated on the other surface of the polarizing film with an adhesive layer interposed therebetween. However, when the cycloolefin-based resin film is subjected to the corona treatment, a white fine powdery material derived from the cycloolefin-based resin is generated, which disadvantageously causes in-process contamination and defective appearance of the polarizing plate.

The following Patent Document 2 discloses a manufacturing method of subjecting a cycloolefin-based resin film to a corona treatment under an output power of 800 N or less power in order to solve such a problem. The manufacturing method can prevent the generation of the white fine powdery material derived from the cycloolefin-based resin. As a result, the manufacturing method enables manufacture of a polarizing plate suppressed in in-process contamination and defective appearance.

However, when the cycloolefin-based resin film subjected to the corona treatment is bonded to the polarizing film, sufficient tackiness is not exhibited immediately after bonding. As a result, the cycloolefin-based resin film is disadvantageously peeled from the polarizing film in the subsequent manufacturing process, or film soaring is disadvantageously generated.

PRIOR ART DOCUMENTS

Patent Documents

Patent Document 1: Japanese Patent Application Laid-Open No. 2006-195320

Patent Document 2: Japanese Patent Application Laid-Open No. 2007-279621

SUMMARY OF THE INVENTION

Problems to be Solved by the Invention

The present invention has been accomplished in view of the above-mentioned problems. It is an object of the present invention to provide a polarizing plate manufacturing method which can prevent adhesion failure between a polarizing film and a transparent protective film even immediately after the transparent protective film is laminated on and adhered to the polarizing film, to improve the throughput, and a polarizing plate obtained by the method. It is another object of the present invention to provide an optical film including the polarizing plate, and an image display device including the polarizing plate or the optical film.

Means for Solving the Problems

As a result of investigation of a polarizing plate manufacturing method, and a polarizing plate and the like obtained by the method, the present inventors have found that the above-mentioned problems can be solved by employing the following constitution and accomplished the present invention.

The present invention relates to a method for manufacturing a polarizing plate comprising a polarizing film and a transparent protective film provided on at least one surface of the polarizing film, the method comprising the steps of: subjecting at least a surface of the transparent protective film to be bonded to the polarizing film to an adhesion improving treatment; bringing water into contact with at least the surface subjected to the adhesion improving treatment; and laminating the transparent protective film on the polarizing film so that the surface subjected to the adhesion improving treatment and brought into contact with water is bonded to the polarizing film. In the polarizing plate manufacturing method, a drying step may be added as necessary after the step of laminating the transparent protective film on the polarizing film.

According to the above-mentioned method, the surface of the transparent protective film to be bonded to the polarizing film is subjected to the adhesion improving treatment, whereby the tackiness of the bonded surface can be improved. Furthermore, the tackiness between the transparent protective film and the polarizing film can be exhibited immediately after the transparent protective film is bonded to and laminated on the polarizing film by bringing at least the surface subjected to the adhesion improving treatment into contact with water. A foreign matter existing on the transparent protective film can be removed by bringing the transparent protective film into contact with water. That is, in the above-mentioned method, the tackiness between the transparent protective film and the polarizing film is good even immediately after the transparent protective film is laminated on the polarizing film. Thereby, the method can prevent the peeling of the transparent protective film from the polarizing film or the generation of film soaring in the subsequent manufacturing process. The method enables manufacture of a polarizing plate having few foreign matter defects and having good appearance.

It is preferred in the method for manufacturing a polarizing plate that the transparent protective film is a cycloolefin-based resin film, a polyester resin film, a polyolefin resin film or a (meth)acrylic resin.

It is preferred in the method for manufacturing a polarizing plate that the adhesion improving treatment is at least one of a corona treatment, a plasma treatment, a flame treatment, an Itro treatment, a glow treatment, an ozone treatment, a primer application treatment and a saponifying treatment. In the present invention, the corona treatment and/or the plasma treatment is/are more preferred among the above adhesion improving treatment in view of productivity.

It is preferred in the method for manufacturing a polarizing plate that the transparent protective film is laminated on the polarizing film with an adhesive layer interposed therebetween. As for the adhesive layer, a pressure-sensitive adhesive layer is contained.

It is preferred in the method for manufacturing a polarizing plate that the temperature of water is in the range of 10° C. to 90° C.

It is preferred in the method for manufacturing a polarizing plate that the adhesive layer is formed of an adhesive containing polyvinyl alcohol (hereinafter, the term "PVA" might be used) or modified polyvinyl alcohol.

It is preferred in the method for manufacturing a polarizing plate that the adhesive layer is formed of a cured product layer obtained by irradiating an active energy ray-curable resin composition with an active energy ray.

The polarizing plate according to the present invention is manufactured by the polarizing plate manufacturing method described above in order to solve the above-mentioned problems. In the polarizing plate, the peeling of a transparent protective film from a polarizing film and the generation of film soaring can be prevented by setting the peeling force between the polarizing film and the transparent protective film to 1 N/20 mm or more.

The optical film according to the present invention is obtained by laminating at least one polarizing plate described above.

The image display device according to the present invention includes the polarizing plate or the optical film described above.

Effects of the Invention

According to the present invention, the surface of the transparent protective film to be bonded to the polarizing film is subjected to the adhesion improving treatment, and then the surface subjected to the adhesion improving treatment is brought into contact with water. Thereby, good tackiness between the polarizing film and the transparent protective film can be exhibited from immediately after the polarizing film is laminated. As a result, in the subsequent manufacturing process, the peeling of the transparent protective film from the polarizing film or the generation of film soaring can be prevented, to improve the throughput. Since the foreign matter can be removed from the transparent protective film by the contact of the transparent protective film with water, a polarizing plate having few foreign matter defects and having good appearance can be manufactured. In the present invention, the reason why good tackiness between the polarizing film and the transparent protective film is exhibited from immediately after the polarizing film is laminated is not clarified. However, the following reason is conceivable.

When the adhesion improving treatment, particularly the corona treatment, the plasma treatment, the flame treatment, the Itro treatment, the glow treatment and/or the ozone treatment is performed, nitrogen in air is oxidized, and impurities containing ammonium nitrate as a main component adhere to the surface of the transparent protective film. Ammonium nitrate suppresses the crosslinking reaction of various adhesives, particularly the polyvinyl alcohol-based adhesive, which generates delay of curing of the adhesive, particularly the polyvinyl alcohol-based adhesive. Such delay of curing is thought to cause initial adhesion failure between the transparent protective film and the polarizing film. If the impurities such as ammonium nitrate adhere to the surface of the transparent protective film even when delay of curing of the adhesive is not generated, the adhering strength of the adhesive in the portion to which the impurities adhere is reduced, which causes concern about the generation of defective appearance (adhesion failure) such as so-called "cissing". However, in the present invention, delay of curing and cissing caused by the impurities such as ammonium nitrate can be prevented by bringing the surface subjected to the adhesion improving treatment into contact with water. As a result, the initial adhesion failure between the transparent protective film and the polarizing film can be remedied.

When an aqueous adhesive such as the polyvinyl alcohol-based adhesive is used, a drying step is generally required after the transparent protective film is bonded to the polarizing film. However, when the adhesive layer is formed of a cured product layer obtained by irradiating an active energy ray-curable resin composition with an active energy ray, a drying time required after the transparent protective film is bonded to the polarizing film can be shortened, or the drying step can be omitted. As a result, the productivity of the polarizing plate is particularly improved.

MODES FOR CARRYING OUT THE INVENTION (Method for Manufacturing Polarizing Plate)

The method for manufacturing a polarizing plate according to this embodiment is a method for manufacturing a polarizing plate including a polarizing film and a transparent protective film provided on at least one surface of the polarizing film. The method includes at least the steps of: subjecting the transparent protective film to an adhesion improving treatment; bringing water into contact with at least the surface subjected to the adhesion improving treatment; and laminating the transparent protective film on the polarizing film. In the present invention, the step of drying the polarizing film and the transparent protective film laminated on the polarizing film may be added as necessary.

The adhesion improving treatment is performed in order to improve the hydrophilicity of the surface of the transparent protective film to be bonded to the polarizing film to improve the tackiness of the transparent protective film to the polarizing film. The surface of the transparent protective film to be bonded to the polarizing film is subjected to the adhesion improving treatment. However, both the surfaces of the transparent protective film may be subjected to the adhesion improving treatment. Specific examples of the adhesion improving treatment include a corona (discharge) treatment, a plasma treatment, a flame treatment, an Itro treatment, a glow treatment, an ozone treatment, a primer application treatment, a saponifying treatment and the like. Among these adhesion improving treatments, the corona treatment and/or the plasma treatment are preferable in view of productivity.

The corona discharge treatment is a method of applying a high-frequency high voltage between a dielectric body and an insulated electrode to generate a corona and treating a surface of a sample passed between the dielectric body and the electrode using the corona. Tackiness is generally given to the surface of the transparent protective film subjected to the corona discharge treatment although it depends on the kind of the electrode, electrode spacing, voltage, humidity and the kind of the transparent protective film to be treated. For example, ceramics and aluminum are preferable as the material of the electrode. The distance between the electrode and the dielectric body is preferably 1 to 5 mm, and more preferably 1 to 3 mm. Furthermore, a line speed (moving speed) is preferably about 3 to about 70 m/min, and more preferably about 3 to about 50 m/min. The corona output strength is preferably set to 0.2 kW to 3 kW, and more preferably 0.5 kW to 1.5 kW. When the corona output strength is less than 0.2 kW, corona discharge is unstable, which may cause difficulty in the application of a stable adhering strength to the surface of the transparent protective film. When the corona output strength is more than 2.0 kW, a flaw may apt to occur in the transparent protective film.

The plasma treatment is a treatment of performing plasma discharge under a gas atmosphere such as an inactive gas, an oxygen gas and the like generated under a reduced pressure or the atmospheric pressure to activate a surface of the transparent protective film. In order to efficiently produce the transparent protective film while transferring the transparent protective film using a roll, the plasma treatment under the atmospheric pressure is preferable.

Since the surface of an object to be treated can be variously modified by variously changing the kind of the gas, the plasma treatment can be performed by appropriately and arbitrarily selecting the kind of the gas when the surface of the transparent protective film is activated. Examples of the kind of the gas to be used include nitrogen, oxygen, argon, helium, acrylic acid, hydroxyalkyl, or a fluorine-based compound such as $CF_4$, $CHF_3$, $C_2F_6$ and the like. These can be used alone or in combination. The plasma output is preferably set to 0.2 kW to 3 kW. The line speed (moving speed) is preferably about 3 to about 70 m/min, and more preferably about 3 to about 50 m/min. The frequency is preferably 3 to 30 kH, and more preferably 5 to 20 kH.

The surface of the transparent protective film after the adhesion improving treatment is activated to increase the wettability of the transparent protective film to water. The degree of activation caused by the adhesion improving treatment, that is, the degree of wettability can be represented, for example, on the basis of a contact angle. When the contact angle is used as a guide, a higher degree of activation causes greater wettability of the transparent protective film to water. Thereby, the contact angle is reduced. As the degree of wettability when the adhesion improving treatment is performed in the present invention, the contact angle to pure water is preferably less than 80°, more preferably less than 50° and particularly preferably 10° to 40°. When the contact angle is more than 50°, as described above, the wettability is reduced. As a result, the tackiness between the transparent protective film and the polarizing film is unpreferably reduced. The value of the contact angle can be measured by, for example, DropMaster (DM-701) manufactured by Kyowa interface Science Co., LTD.

The step of bringing the transparent protective film into contact with water is performed in order to remedy initial adhesion failure between the surface of the transparent protective film subjected to the adhesion improving treatment to be activated and the polarizing film. A white fine powdery material which may be produced from the transparent protective film by the adhesion improving treatment, a foreign matter adhering to the surface of the film, and an environmental foreign matter adsorbed to the surface of the film by static electricity can also be simultaneously removed by performing this step. The step is particularly suitable when the transparent protective film is a cycloolefin-based resin film.

Various substances may be added to water brought into contact with the transparent protective film. Examples thereof include a water-soluble organic solvent such as ethanol and the like, an acid-base such as sodium hydroxide, hydrochloric acid and the like, a water-soluble polymer such as a surfactant and the like, and a salt such as sodium chloride and the like. The additive amount can be appropriately set as necessary. It is preferable that water does not contain alumina, polyvinyl alcohol, or a nonvolatile component such as aqueous urethane and the like. Even when water contains the nonvolatile component, the content thereof is preferably 500 mg/L or less. When the content of the nonvolatile component is more than 500 mg/L, the surface of the transparent protective film may be contaminated with the nonvolatile component to generate defective appearance in the manufactured polarizing plate. The temperature of water is preferably 10° C. to 90° C., and more preferably 20° C. to 80° C. When the temperature of water brought into contact with the transparent protective film is less than 10° C., it is difficult to obtain an effect of improving the initial tackiness. A temperature of 90° C. or more is unpreferable since the transparent protective film absorbs water to swell, and the polarizing plate may easily curl.

The method of bringing the transparent protective film with water is not particularly limited. Examples thereof include bath immersion, spray coating, coater coating or the like. The kind of the coater is not particularly limited, and examples thereof include a die coater, a gravure coater, a reverse coater, a capillary coater, a blade coater, a roll coater or the like. Among these contact methods, a method of immersing the transparent protective film in water (for example, a method of immersing the transparent protective film in water, a method of bringing the transparent protective film into contact with a water surface or the like) as in the bath immersion or the like is preferable in the present invention. This method can uniformly bring the whole transparent protective film into contact with water. The contact time of the transparent protective film with water is preferably 1 second to 1 minute. When the contact time is less than 1 second, it may be difficult to bring the whole surface of the transparent protective film into contact with water. In contrast, when the contact time exceeds 1 minute, the transparent protective film may swell due to water absorption. The number of times of the contact of the transparent protective film with water is not particularly limited. The number of times thereof may be only once, or may be more than once as necessary. When the transparent protective film is brought into contact with water more than once, water used at the contact may be obtained by appropriately adjusting the kind and concentration of an additive agent contained in water.

The transparent protective film brought into contact with water can be washed as necessary. The washing method is not particularly limited, and examples thereof include a method of immersing the transparent protective film in water (for example, a method of immersing the transparent protective film in water, a method of bringing the transparent protective film into contact with a water surface or the like) as in the bath immersion or the like, spray coating, and coating using a coater or the like. A cleaning liquid is preferably pure water. However, in order to improve drying efficiency of the transparent protective film, an organic solvent (for example, ethanol or the like) having compatibility with water may be appropriately added. The additive amount of the organic solvent can be appropriately set as necessary.

The transparent protective film brought into contact with water may be dried. When the polarizing film is brought into contact with water, the polarizing film may swell, but the drying can prevent the swelling. The drying time is preferably 5 seconds to 30 minutes, and more preferably 5 seconds to 20 minutes. The drying temperature is preferably 25 to 150° C., and more preferably 35 to 90° C.

In the step of laminating the transparent protective film on the polarizing film, the transparent protective film is laminated on the polarizing film so that the surface of the transparent protective film subjected to the adhesion improving treatment and brought into contact with water is bonded to the polarizing film. The step may be performed after the elapse of several days from the step of bringing the transparent protective film into contact with water. However, the step is preferably performed within 48 hours, and more preferably performed within 24 hours. The laminating method is not particularly limited, and examples thereof include a dry laminating method using a roll laminator, or the like. The dry laminating method is preferable in view of good adhering strength. There are cases where a solvent component is left in the obtained polarizing plate, or the left solvent is blocked by the protective film during drying and the solvent cannot be removed from the polarizing plate. However, the dry laminating method can prevent the solvent from causing hue change and deterioration of polarization properties caused by the adverse effect due to such phenomena on the polarizing film.

The temperature for bonding the protective film to the polarizing film is preferably in the range of 15 to 30° C., and more preferably in the range of 20 to 25° C. When the bonding temperature is less than 15° C., the tackiness between the protective film and the polarizing film may be insufficient. In contrast, when the temperature is more than 30° C., the polarizing film or the protective film may disadvantageously shrink.

In this step, the polarizing film and the transparent protective film may be laminated with an adhesive layer (including a pressure-sensitive type adhesive layer (pressure-sensitive adhesive layer)) interposed therebetween. The adhesive layer may be formed on the bonded surface of either one of the polarizing film and the protective film, or the bonded surfaces of both the polarizing film and the protective film. The adhesive layer may be formed on both the surfaces or a surface of the polarizing film or the protective film. The forming method of the adhesive layer is not particularly limited, and for example, the forming method is preferably performed by the application or dropping of an adhesive composition. In the case of the application, the method is appropriately selected according to the viscosity of the adhesive composition and the thickness of the objective adhesive layer. Specific examples thereof include a reverse coater, a gravure coater (direct, reverse or offset), a bar reverse coater, a roll coater, a die coater, a bar coater, a rod coater or the like. In addition, a dipping system or the like can be appropriately used for coating. The adhesive composition is preferably used in a solventless or low-solvent (solvent content rate: 5% by weight or less) state so that the adhesive composition is suitable for a dry laminating method. In the dry laminating method, the solvent content rate of the adhesive composition when the protective film is bonded to the polarizing film is preferably 5% by weight or less, and more preferably 2% by weight or less.

After the transparent protective film is laminated on the polarizing film, a drying step is preferably performed. Thereby, water existing between the polarizing film and the transparent protective film can be dried. When an aqueous thermosetting type adhesive composition is applied between the polarizing film and the transparent protective film, an adhesive layer can be formed. In more detail, when the adhesive composition is an aqueous or solvent type adhesive composition, the adhesive layer can be formed by evaporating moisture or the solvent contained in the composition and curing the adhesive composition. When the adhesive composition is a solventless type adhesive composition, the adhesive layer can be formed by curing the adhesive composition. A method of a drying treatment is not particularly limited, and for example, the drying may be performed by spraying hot wind, or while gradually changing the drying temperature at every predetermined time. The heat-treating means for drying is not particularly limited, and for example, a method using a hot plate, an oven, a belt furnace or the like is appropriately employed. The drying temperature is preferably in the range of 40 to 100° C., and more preferably in the range of 60 to 90° C. When the drying temperature is less than 40° C., the moisture or the solvent in the adhesive composition is not sufficiently evaporated, which may cause hue change of the polarizing film and the deterioration of the polarization properties thereof. In contrast, when the drying temperature exceeds 100° C., the polarizing film may be deteriorated by excessive drying. The drying time is preferably in the range of 5 to 1200 seconds. When the drying time is less than 5 seconds, the moisture or the solvent in the adhesive composition is not sufficiently evaporated, which may cause hue change of the polarizing film and the deterioration of the polarization properties thereof. In contrast, when the drying time exceeds 1200 seconds, the polarizing film may be deteriorated by excessive drying. The moisture percentage of the polarizing plate immediately after drying is preferably set to 1 to 10% by weight, and more preferably 2 to 6% by weight. When the moisture percentage is less than 1% by weight, the durability of the polarizing plate in humidifying may be reduced. When the moisture percentage exceeds 10% by weight, the durability of the polarizing plate in heating may be reduced. The term "immediately after drying" means "within 6 hours after drying". The moisture percentage of the polarizing plate is a value calculated by measuring the weight $W_0$ of the polarizing plate before drying and the weight $W_1$ of the polarizing plate within 6 hours after drying and using the weight $W_0$ and the weight $W_1$ in the following formula.

$$\text{Moisture percentage (\%) of Polarizing Plate} = \{(W_0 - W_1)/W_0\} \times 100$$

In the present invention, sufficient tackiness between the transparent protective film and the polarizing film can be exhibited immediately after laminating the transparent protective film on the polarizing film and drying the laminate as necessary, specifically, for example, within 6 hours. Even when the adhesion improving treatment is performed in a conventional method for manufacturing a polarizing plate, it is difficult to exhibit sufficient tackiness until after the elapse of at least about 6 hours. Therefore, in the conventional manufacturing method, it is necessary to leave the transparent protective film and the polarizing film until the tackiness is sufficiently exhibited in view of preventing the peeling of the transparent protective film from the polarizing film or the generation of film soaring. Also in the present invention, a drying step may be performed as necessary after the laminating step and the polarizing plate may be left (cured) for a certain period. In this case, the leaving time is preferably 10 hours or more, and more preferably several days or more. The temperature during the leaving period is preferably 10 to 50° C., and more preferably 20 to 40° C. Thereby, the adhering strength between the transparent protective film and the polarizing film can be further improved.

The polarizing plate providing no peeling of the transparent protective film from the polarizing film and no film soaring and having few foreign matter defects can be manufactured by performing the above-mentioned steps.

(Polarizing Plate)

Next, the polarizing plate obtained by the method for manufacturing the polarizing plate according to this embodiment will be described. The polarizing plate according to this embodiment has a structure in which the protective film is bonded to at least one surface of the polarizing film. The peeling force between the transparent protective film and the polarizing film is preferably 1 N/20 mm or more. The peeling force is a value obtained by a method according to the peeling adhesive strength testing method of JIS K 6854-1 under measuring conditions of a temperature of 15 to 40° C., a relative humidity of 20 to 80% Rh, a peeling angle of 90° and a peeling rate of 100 to 3000 mm/min. The peeling force is a value obtained by measurement performed after 1 hour from the time point at which the transparent protective film is laminated on the polarizing film and the laminate is dried. The peeling between the transparent protective film and the polarizing film and the generation of film soaring can be prevented by setting the peeling force to 1 N/20 mm or more. The upper limit of the peeling force between the transparent protective film and the polarizing film is not particularly limited. However, for example, an upper limit of about 4 N/20 mm is exemplified.

<Polarizing Film>

The polarizing film is not particularly limited and various polarizing films can be used. Examples of the polarizing film include a uniaxially stretched hydrophilic polymer film to which a dichroic substance such as iodine, a dichroic dye and the like is adsorbed, and a polyethylene-based oriented film made of a dehydrated material of polyvinyl alcohol and a dehydrochlorinated material of polyvinyl chloride. Examples of the hydrophilic polymer film include a polyvinyl alcohol-based film, a partially formalized polyvinyl alcohol-based film, a polyethylene terephthalate-based film, a cellulose-based film, an ethylene-vinyl acetate copolymer-based partially saponified film or the like. Among these, a polarizing film made of an uniaxially stretched polyvinyl alcohol-based film to which a dichroic substance such as iodine, a dichroic dye and the like is adsorbed, is suitable.

The thickness of the polarizing film is not particularly limited, and is usually about 5 to about 80 µl.

As the method for manufacturing the polarizing film, an any suitable method is employed according to the object, the used material, conditions and the like. For example, a method is employed, which subjects the polyvinyl alcohol-based film to a series of manufacturing steps including swelling, dyeing, cross-linking, stretching, water washing and drying steps. In each of the treatment steps except the drying step, the treatment is performed by immersing the polyvinyl alcohol-based film in a liquid containing a solution used for each of the steps. The order, number of times, and presence or absence of implementation of the treatments of swelling, dyeing, cross-linking, stretching, water washing and drying are appropriately set according to the object, the used material, conditions and the like. For example, some treatments may be simultaneously performed in one step. The swelling treatment, the dyeing treatment and the cross-linking treatment may be simultaneously performed. For example, a method of performing the cross-linking treatment before and after the stretching treatment can be suitably employed. For example, the water washing treatment may be performed after all the treatments, or the water washing treatment may be performed only after a specific treatment.

<Transparent Protective Film>

As a material constituting the transparent protective film, for example, a thermoplastic resin having excellent transparency, mechanical strength, thermal stability, moisture barrier properties, isotropy and the like is used. Specific examples of such a thermoplastic resin include a polyester resin, a polyether sulfone resin, a polysulfone resin, a polycarbonate resin, a polyamide resin, a polyimide resin, a polyolefin resin, a (meth)acrylic resin, a cyclic polyolefin resin (cycloolefin-based resin), a polyarylate resin, a polystyrene resin, a polyvinyl alcohol resin, or a mixture thereof. Among these thermoplastic resins, the polyester resin, the polyolefin resin, the (meth)acrylic resin or the cyclic polyolefin resin are preferably used in the present invention. These thermoplastic resins can be used in the form of a film or a sheet.

Examples of the polyester resin include polyethylene terephthalate, polytrimethylene terephthalate, polybutylene terephthalate, polyethylene naphthalate, polybutylene naphthalate or the like.

Examples of the (meth)acrylic resin include a (meth) acrylic resin described in paragraphs [0017] to [0043] of Japanese Patent Application Laid-Open No. 2010-055062.

Examples of the polyolefin resin include one or a mixture of two or more selected from low-density polyethylene, medium-density polyethylene, high-density polyethylene, linear low-density polyethylene, an ethylene-α-olefin copolymer, an ethylene-ethyl acrylate copolymer, an ethylene-vinyl acetate copolymer, an ethylene-methyl acrylate copolymer, an ethylene-n-butyl acrylate copolymer, polypropylene (a homopolymer, a random copolymer or a block copolymer), or the like which are described in paragraph [0011] of Japanese Patent Application Laid-Open No. 2010-132889.

In the present invention, even when the cyclic polyolefin resin (cycloolefin-based resin) is used as the transparent protective film, the tackiness between the transparent protective film and the polarizing film can be made suitable. The cycloolefin-based resin is a general term for a resin prepared through polymerization of a cyclic olefin as a polymerization unit. Examples thereof include resins described in Japanese Patent Application Laid-Open Nos. 1-240517, 3-14882 and 3-122137. In more detail, examples thereof include: a ring opening (co)polymer of a cyclic olefin; an addition polymer of a cyclic olefin; a copolymer (typically, a random copolymer) of a cyclic olefin and an α-olefin such as ethylene, propylene and the like; graft polymers of these substances each modified with an unsaturated carboxylic acid or a derivative thereof; and hydrides thereof.

Various products such as a norbornene-based resin and the like are commercially available as the cycloolefin-based resin. Specific examples thereof include trade names "ZEONEX" and "ZEONOR." each manufactured by Zeon Corporation, trade name "Arton" manufactured by JSR Corporation, trade name "TOPAS" manufactured by TICONA Corporation, trade name "APEL" manufactured by Mitsui Chemicals, Inc., trade name "Escena" manufactured by Sekisui Chemical Co., Ltd or the like.

The transparent protective film may contain one or more any suitable additive agents. Examples of the additive agent include an ultraviolet absorber, an antioxidant, a lubricant, a plasticizer, a release agent, a color protection agent, a fire retardant, a nucleic agent, an antistatic agent, a pigment, a colorant or the like. The content of the additive agents in the transparent protective film is preferably 0 to 50% by weight, more preferably 1 to 50% by weight, still more preferably 2 to 40% by weight, and particularly preferably 3 to 30% by weight. When the content of the additive agents in the transparent protective film is more than 50% by weight, there is a possibility that high transparency or the like that the thermoplastic resin originally has cannot be sufficiently exhibited. These transparent protective films may be stretched.

The thickness of the transparent protective film can be appropriately set. However, the thickness is generally about 1 to about 500 μm in view of strength, workability such as handling and the like, thin layer properties, and the like. The thickness is particularly preferably 1 to 300 μm, and more preferably 5 to 2001 μm. The transparent protective film having a thickness of 5 to 150 μm is particularly suitable.

When the transparent protective films are respectively provided on both the sides of the polarizing film, transparent protective films made of the same polymer material may be used on the front and back sides. Alternatively, transparent protective films made of different polymer materials may be used.

A hard coat layer may be provided, or an antireflection treatment or a treatment for anti-sticking, diffusion or antiglare may be applied to the surface of the transparent protective film to which the polarizing film is not bonded.

A transparent protective film having a front retardation of less than 40 nm and a thickness direction retardation of less than 80 nm is usually used as the transparent protective film. The front retardation Re is expressed by the formula Re=(nx−ny)×d. The thickness direction retardation Rth is expressed by the formula Rth=(nx−nz)×d. The Nz coefficient is expressed by the formula Nz=(nx−nz)/(nx−ny), wherein the refractive indices of the film in the directions of its slow axis, fast axis and thickness are respectively nx, ny and nz; d (nm) is the thickness of the film; and the direction of the slow axis is a direction in which the in-plane refractive index of the film is maximum. It is preferable that the transparent protective film has as little coloring as possible. A protective film having a thickness direction retardation of −90 nm to +75 nm is preferably used. Thus, coloring (optical coloring) of the polarizing plate resulting from a transparent protective film can be mostly cancelled by using a protective film having a thickness direction retardation (Rth) of −90 nm to +75 nm. The thickness direction retardation (Rth) is more preferably −80 nm to +60 nm, and particularly preferably −70 nm to +45 nm.

In contrast, a retardation plate having a front retardation of 40 nm or more and/or a thickness direction retardation of 80 nm or more can be used as the transparent protective film. The front retardation is usually controlled in the range of 40 to 200 nm, and the thickness direction retardation is usually controlled in the range of 80 to 300 nm. The retardation plate for use as the transparent protective film also has the function of the transparent protective film and thus can contribute to the reduction of the thickness.

<Adhesive Layer>

The polarizing plate according to this embodiment may have a structure where the polarizing film and the transparent protective film are laminated with an adhesive layer (including a pressure-sensitive type adhesive layer (pressure-sensitive adhesive layer)) interposed therebetween.

An adhesive composition having transparency to light and having optical isotropy is preferable as an adhesive composition serving as a construction material of the adhesive layer. An aqueous, solvent type, emulsion-based or solventless type adhesive composition can be used without any limitation. Examples of the aqueous adhesive include an isocyanate-based adhesive, a polyvinyl alcohol-based adhesive, a gelatin-based adhesive, a vinyl-based latex, an aqueous polyurethane, an aqueous polyester or the like. Preferable examples thereof include a polyvinyl alcohol-based adhesive such as polyvinyl alcohol, modified polyvinyl alcohol and the like. More preferable examples thereof include an adhesive containing polyvinyl alcohol as a main component and having an acetoacetyl group. Specific examples of such an adhesive include trade name "Gohsefimer Z" manufactured by Nippon Synthetic Chemical Industry Co., Ltd. A pressure-sensitive adhesive may be used as the construction material of the adhesive composition. The pressure-sensitive adhesive is not particularly limited and various pressure-sensitive adhesives which have been conventionally known can be employed. The solid content concentration of the adhesive composition is preferably 0.1 to 10% by weight, and more preferably 1 to 6% by weight.

A cross-linking agent can be mixed with the aqueous adhesive. The kind of the cross-linking agent can be appropriately selected according to the kind of the adhesive. For example, a compound having at least two functional groups and having reactivity with the polyvinyl alcohol-based resin can be used as the cross-linking agent used for the polyvinyl alcohol-based adhesive. Examples thereof include an alkylene diamine-based compound; an isocyanate-based compound; an epoxy-based compound; an aldehyde compound; a methylol compound such as methylol urea, methylol melamine, alkylated methylol urea, alkylated methylol melamine and the like; an amino formaldehyde resin such as a condensation product of acetoguanamine, benzoguanamine, formaldehyde and the like, a salt of a bivalent metal or a trivalent metal, and an oxide thereof.

The mixing amount of the cross-linking agent can be appropriately designed according to the kind or the like of the polyvinyl alcohol-based resin. However, the mixing amount is usually about 1 to about 50 parts by weight, and preferably about 5 to about 40 parts by weight based on 100 parts by weight of the polyvinyl alcohol-based resin.

Various ultraviolet absorbers, an antioxidant, a metal compound filler (metal compound colloid), a stabilizer such as a heat-resistant stabilizer, a hydrolysis-resistant stabilizer and the like as the additive agent can also be mixed with the aqueous adhesive.

The adhesive layer may be formed of a cured product layer obtained by irradiating an active energy ray-curable resin composition with an active energy ray. The active energy ray-curable resin composition contains a compound having a (meth)acryloyl group, a compound having a vinyl group, or the like as a curable component. Particularly when an N-substituted amide-based monomer represented by the following general formula (1) is used as the compound having a (meth)acryloyl group, the adhesive layer preferably has good tackiness.

$$CH_2=C(R^1)-CONH_{2-m}-(X-O-R^2)_m \qquad (1)$$

wherein $R^1$ represents a hydrogen atom or a methyl group; X represents a —$CH_2$— group or a —$CH_2CH_2$— group; $R^2$ represents a —$(CH_2)_n$—H group (n=0, 1 or 2); and m represents 1 or 2. The (meth)acryloyl group means an acryloyl group and/or a methacryloyl group.

Specific examples of the N-substituted amide-based monomer include N-hydroxyethyl(meth)acrylamide, N-methylol(meth)acrylamide, N-methoxymethyl(meth)acrylamide, N-ethoxymethyl(meth)acrylamide, N-methoxyethyl(meth)acrylamide, N-ethoxyethyl(meth)acrylamide or the like. These N-substituted amide-based monomers can be used alone or in combination of two or more.

A commercialized product can also be suitably used as the N-substituted amide-based monomer. Specific examples thereof include N-hydroxyethyl acrylamide (trade name "HEAA" manufactured by Kohjin Co., Ltd.), N-methoxymethyl acrylamide (trade name "Wasmer 2MA") manufactured by Kasano Kosan Corporation, N-ethoxymethyl acrylamide (trade name "Wasmer EMA" manufactured by Kasano Kosan Corporation), N-methoxymethyl methacrylamide (trade name "Wasmer 2MA" manufactured by Kasano Kosan Corporation) or the like.

When the adhesive layer contains a monomer having two or more carbon-carbon double bonds, particularly preferably a polyfunctional (meth)acrylate-based monomer in addition to the N-substituted amide-based monomer represented by the general formula (1) as the curable component, the water resistance of the adhesive layer is preferably improved. When the water resistance of the adhesive layer is considered, the monomer having two or more carbon-carbon double bonds is more preferably hydrophobic. Examples of the hydrophobic monomer having two or more carbon-carbon double bonds, particularly a hydrophobic polyfunctional (meth)acrylate-based monomer include tricyclodecane dimethanol diacrylate, divinylbenzene, N,N'-methylenebisacrylamide, ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, 1,4-butanediol di(meth)acrylate, neopentyl glycol di(meth)acrylate, 1,6-hexanediol di(meth)acrylate, 1,9-nonanediol glycol di(meth)acrylate, glycerin di(meth)acrylate, EO-modified glycerin tri(meth)acrylate, EO-modified diglycerin tetra(meth)acrylate, 2-(2-vinyloxyethoxy)ethyl (meth)acrylate, bisphenol A-EO adduct di(meth)acrylate, trimethylolpropane tri(meth)acrylate, hydroxy pivalate neopentyl glycol(meth)acrylic acid adduct, EO-modified trimethylolpropane tri(meth)acrylate, pentaerythritol tri(meth)acrylate, pentaerythritol tetra(meth)acrylate, dipentaerythritol hexa(meth)acrylate, isocyanuric acid EO-modified di(meth)acrylate, isocyanuric acid EO-modified tri(meth)acrylate, ε-caprolactone modified tris((meth)acroxyethyl) isocyanurate, 1,1-bis((meth)acryloyloxy methyl)ethyl isocyanate, a polymer of 2-hydroxyethyl(meth)acrylate and 1,6-diisocyanate hexane, 9,9-bis[4-(2-(meth)acryloyloxyethoxy)phenyl]florene or the like.

When the monomer having two or more carbon-carbon double bonds is contained in addition to the N-substituted amide-based monomer represented by the general formula (1) as the curable component, the ratio thereof is preferably 5 to 50% by mass, and more preferably 9 to 40% by mass. When the ratio is less than 5% by mass, sufficient water resistance may not be obtained. In contrast, when the ratio exceeds 50% by mass, sufficient tackiness may not obtained.

Monomers other than the N-substituted amide-based monomer represented by the general formula (1) and the monomer having two or more carbon-carbon double bonds can be used in combination as the curable component as long as tackiness, durability and water resistance are not deteriorated. Examples of such a monomer include an N-substituted amide-based monomer other than the N-substituted amide-based monomer represented by the general formula (1), such as N-methyl(meth)acrylamide, N,N-dimethyl(meth)acrylamide, N,N-diethyl(meth)acrylamide, N-isopropyl acrylamide, N-butyl(meth)acrylamide, N-hexyl(meth)acrylamide, aminomethyl(meth)acrylamide, aminoethyl(meth)acrylamide, mercaptomethyl(meth)acrylamide, mercaptoethyl (meth)acrylamide, N-acryloyl morpholine, N-acryloyl piperidine, N-methacryloyl piperidine, N-acryloyl pyrrolidine and the like.

Various monofunctional (meth)acrylates, urethane (meth)acrylates and polyester (meth)acrylates having an aromatic ring and a hydroxy group may be used as the curable component.

Various monofunctional (meth)acrylates having an aromatic ring and a hydroxy group can be used as the monofunctional (meth)acrylate having an aromatic ring and a hydroxy group. The hydroxy group may exist as the substituent of the aromatic ring. However, in the present invention, the hydroxy group preferably exists as an organic group (a hydrocarbon group, particularly a hydrocarbon group bonded to an alkylene group) bonding the aromatic ring and the (meth)acrylate Examples of the monofunctional (meth)acrylate having an aromatic ring and a hydroxy group include a reactant of a monofunctional epoxy compound having an aromatic ring and (meth)acrylic acid. Examples of the monofunctional epoxy compound having an aromatic ring include phenyl glycidyl ether, t-butyl phenyl glycidyl ether, phenyl polyethylene glycol glycidyl ether or the like. Specific examples of the monofunctional (meth)acrylate having an aromatic ring and a hydroxy group include 2-hydroxy-3-phenoxypropyl (meth)acrylate, 2-hydroxy-3-t-butylphenoxypropyl(meth)acrylate, 2-hydroxy-3-phenyl polyethylene glycol propyl (meth)acrylate or the like.

Examples of the urethane (meth)acrylate include a reactant of (meth)acrylate having an isocyanate group, and a hydroxyl group at one end of a diol compound such as polyalkylene glycol, for example, polyurethane diol, polyester diol, polyether diol, polyethylene glycol, polypropylene glycol and the like, and the like.

An optical cation type curable composition mainly composed of an epoxy compound and a photoacid generator can also be used as the active energy ray-curable resin composition in addition to the composition using the compound having a (meth)acryloyl group as the curable component. Examples of the usable epoxy compound include compounds described in paragraphs [0031] to [0085] of Japanese Patent Application Laid-Open No. 2010-145537. Examples of the photoacid generator include compounds described in paragraphs [0080] to [0095] of Japanese Patent Application Laid-Open No. 2009-013316.

Various additive agents can be mixed with the active energy ray-curable resin composition as other optional components. Examples of the additive agent include a polymer or an oligomer such as an epoxy resin, polyamide, polyamideimide, polyurethane, polybutadiene, polychloroprene, polyether, polyester, a styrene-butadiene block copolymer, a petroleum resin, a xylene resin, a ketone resin, a cellulosic resin, a fluorine-based oligomer, a silicone-based oligomer, a polysulfide-based oligomer and the like; a polymerization inhibitor such as phenothiazine, 2,6-di-t-butyl-4-methyl phenol and the like; an auxiliary photopolymerization initiator; a leveling agent; a wettability improving agent; a surfactant; a plasticizer; an ultraviolet absorber; a silane coupling agent; an inorganic filler; a pigment; a dye or the like.

The active energy ray-curable resin composition can be used in an electron beam curing type or ultraviolet-ray curing type aspect.

In the electron beam curing type, any suitable condition can be employed as the irradiation condition of the electron beam as long as the irradiation condition can cure the active energy ray-curable resin composition. For example, in the irradiation of the electron beam, an accelerating voltage is preferably 5 kV to 300 kV, and more preferably 10 kV to 250 kV. When the accelerating voltage is less than 5 kV, the electron beam does not reach the adhesive, which may cause insufficient curing of the adhesive. When the accelerating voltage exceeds 300 kV, an osmotic force passing through the sample is too strong and the electron beam rebounds, which may damage the transparent protective film and a polarizer. The irradiation dose is 5 to 100 kGy, and more preferably 10 to 75 kGy. When the irradiation dose is less than 5 kGy, curing of the adhesive is insufficient. When the irradiation dose exceeds 100 kGy, the irradiation dose damages the transparent protective film and the polarizer to cause reduction of mechanical strength and yellowing. Therefore, predetermined optical characteristics cannot be obtained.

The electron beam irradiation is usually performed in an inactive gas. However, if necessary, the electron beam irradiation may be performed in the atmosphere or under a condition with a small amount of oxygen introduced. Although it depends on the material of the transparent protective film, oxygen inhibition is intentionally produced on the surface of the transparent protective film first subjected to the electron beam radiation by appropriately introducing oxygen. Therefore, the damage to the transparent protective film can be prevented, and only the adhesive can be efficiently irradiated with the electron beam.

In contrast, when a protective film to which ultraviolet absorption capacity is given is used in the ultraviolet-ray curing type, light having a wavelength shorter than about 380 nm is absorbed. Since the light having a wavelength shorter than 380 nm does not reach the active energy ray-curable resin composition, the light does not contribute to the polymerization reaction. Furthermore, the light having a wavelength shorter than 380 nm and absorbed by the protective film is converted into heat. The protective film itself generates heat, which causes defects such as curl and wrinkle of the polarizing plate. Therefore, when the ultraviolet-ray curing type is employed in the present invention, a device which does not emit light having a wavelength shorter than 380 nm is preferably used as an ultraviolet generator. More specifically, a ratio of the integrated illumination of a wavelength range of 380 to 440 nm to the integrated illumination of a wavelength range of 250 to 370 nm is preferably 100:0 to 100:50, and more preferably 100:0 to 100:40. As the ultraviolet ray satisfying the relationship of the integrated illumination, a gallium-containing metal halide lamp and an LED light source emitting light having a wavelength range of 380 to 440 nm are preferable. Alternatively, a low-pressure mercury lamp, a medium-pressure mercury lamp, a high-pressure mercury lamp, an ultrahigh-pressure mercury lamp, a filament lamp, a xenon lamp, a halogen lamp, a carbon-arc lamp, a metal halide lamp, a fluorescent lamp, a tungsten lamp, a gallium lamp, an excimer laser or sunlight can be used as a light source, with the light having a wavelength shorter than 380 nm cut off by using a bandpass filter.

Before the ultraviolet-ray curing type active energy ray-curable resin composition is irradiated with an ultraviolet ray, the active energy ray-curable resin composition is preferably heated (heating before irradiation). In that case, the active energy ray-curable resin composition is preferably heated to 40° C. or more, and more preferably 50° C. or more. After the active energy ray-curable resin composition is irradiated with an ultraviolet ray, the active energy ray-curable resin composition is preferably heated (heating after irradiation). In that case, the active energy ray-curable resin composition is preferably heated to 40° C. or more, and more preferably 50° C. or more.

When the active energy ray-curable resin composition is used in the electron beam curing type, it is not particularly necessary to add a photopolymerization initiator to the composition. However, when the active energy ray-curable resin composition is used in the ultraviolet-ray curing type, a photoradical generator is preferably used. Examples of the photoradical generator include a hydrogen abstracting type photoradical generator and a cleavage type photoradical generator.

Examples of the hydrogen abstracting type photoradical generator include a naphthalene derivative such as 1-methylnaphthalene, 2-methylnaphthalene, 1-fluoronaphtalene, 1-chloronaphtalene, 2-chloronaphtalene, 1-bromonaphthalene, 2-bromonaphthalene, 1-iodonaphthalene, 2-iodonaphthalene, 1-naphthol, 2-naphthol, 1-methoxynaphthalene, 2-methoxynaphthalene, 1,4-dicyanonaphthalene and the like, an anthracene derivative such as anthracene, 1,2-benzanthracene, 9,10-dichloroanthracene, 9,10-dibromoanthracene, 9,10-diphenylanthracene, 9-cyanoanthracene, 9,10-dicyanoanthracene, 2,6,9,10-tetracyanoanthracene and the like, a pyrene derivative, a carbazole derivative such as carbazole, 9-methylcarbazole, 9-phenylcarbazole, 9-prop-2-ynyl-9H-carbazole, 9-propyl-9H-carbazole, 9-vinylcarbazole, 9H-carbazole-9-ethanol, 9-methyl-3-nitro-9H-carbazole, 9-methyl-3,6-dinitro-9H-carbazole, 9-octanoylcarbazole, 9-carbazole methanol, 9-carbazolepropionic acid, 9-carbazolepropionitrile, 9-ethyl-3,6-dinitro-9H-carbazole, 9-ethyl-3-nitrocarbazole, 9-ethylcarbazole, 9-isopropylcarbazole, 9-(ethoxycarbonylmethyl)carbazole, 9-(morpholinomethyl)carbazole, 9-acetylcarbazole, 9-allylcarbazole, 9-benzyl-9H-carbazole, 9-carbazoleacetic acid, 9-(2-nitrothenyl)carbazole, 9-(4-methoxypheny)carbazole, 9-(1-ethoxy-2-methyl-propyl)-9H-carbazole, 3-nitrocarbazole, 4-hydroxycarbazole, 3,6-dinitro-9H-carbazole, 3,6-diphenyl-9H-carbazole, 2-hydroxycarbazole, 3,6-diacetyl-9-ethylcarbazole and the like, a benzophenone derivative such as benzophenone, 4-phenylbenzophenone, 4,4'-bis(dimethoxy)benzophenone, 4,4'-bis(dimethylamino)benzophenone, 4,4'-bis(diethylamino)benzophenone, 2-benzoylbenzoic acid methyl ester, 2-methylbenzophenone, 3-methylbenzophenone, 4-methylbenzophenone, 3,3'-dimethyl-4-methoxybenzophenone, 2,4,6-trimethylbenzophenone and the like, an aromatic carbonyl compound, [4-(4-methylphenylthio)phenyl]-phenylmethanone, a thioxanthone derivative such as xanthone, thioxanthone, 1-chlorothioxanthone, 4-chlorothioxanthone, 2-isopropylthioxanthone, 4-isopropylthioxanthone, 2,4-dimethylthioxanthone, 2,4-diethylthioxanthone, 1-chloro-4-propoxythioxanthone and the like, a coumarin derivative, and the like.

The cleavage type photoradical generator is a photoradical generator which is cleaved by the irradiation of the active energy ray to generate a radical. Specific examples thereof include aryl alkyl ketones such as a benzoin ether derivative, an acetophenone derivative abd the like, oxime ketones, acyl phosphine oxides, thiobenzoic acid S-phenyls, titanocenes and a derivative obtained by the polymerization thereof. However, the cleavage type photoradical generator is not limited thereto. Examples of the commercially available cleavage type photoradical generator include 1-(4-dodecylbenzoyl)-1-hydroxy-1-methylethane, 1-(4-isopropylbenzoyl)-1-hydroxy-1-methylethane, 1-benzoyl-1-hydroxy-1-methylethane, 1-[4-(2-hydroxyethoxy)-benzoyl]-1-hydroxy-1-methylethane, 1-[4-(acryloyloxyethoxy)-benzoyl]-1-hydroxy-1-methylethane, diphenylketone, phenyl-1-hydroxy-cyclohexylketone, benzil dimethyl ketal, bis(cyclopentadienyl)-bis(2,6-difluoro-3-pyrryl-phenyl) titanium, (η6-isopropylbenzene)-(η5-cyclopentadienyl)-iron(II)hexafluorophosphate, trimethylbenzoyl diphenyl phosphine oxide, bis(2,6-dimethoxy-benzoyl)-(2,4,4-trimethyl-pentyl)-phosphine oxide, bis(2,4,6-trimethylbenzoyl)-2,4-dipentoxy phenyl phosphine oxide or bis(2,4,6-trimethylbenzoyl)phenyl-phosphine oxide, (4-morpholinobenzoyl)-1-benzyl-1-dimethylamino propane, 4-(methylthiobenzoyl)-1-methyl-1-morpholinoethane or the like. However, the cleavage type photoradical generator is not limited thereto.

The photoradical generator used in the present invention, that is, the hydrogen abstracting type and cleavage type photoradical generators can be respectively used alone. In addition, a plurality of photoradical generators may be used in combination. The combination of one or more cleavage type photoradical generators is more preferable in view of stability of the single photoradical generator and the curability of the composition in the present invention. Among the cleavage type photoradical generators, the acyl phosphine oxides are preferable. More specifically, trimethylbenzoyl diphenyl phosphine oxide (trade name "DAROCURE TPO"; manufactured by Ciba Japan), bis(2,6-dimethoxy-benzoyl)-(2,4,4-trimethyl-pentyl)-phosphine oxide (trade name "CGI 403"; manufactured by Ciba Japan) or his (2,4,6-trimethylbenzoyl)-2,4-dipentoxy phenyl phosphine oxide (trade name "IRGACURE 819"; manufactured by Ciba Japan) is preferable.

When the photoradical generator is used, the amount thereof to be used is preferably 0.01 to 10 parts by mass, more preferably 0.05 to 5 parts by mass, and particularly preferably 0.1 to 3 parts by mass based on the total amount of the active energy ray-curable resin composition.

To the active energy ray-curable resin composition according to the present invention, a sensitizer having a curing rate and sensitivity improved by the electron beam and represented by a carbonyl compound or the like may be added in addition to the photoradical generator.

Examples of the sensitizer include anthracene, phenothiazene, perylene, thioxanthone, benzophenone thioxanthone or the like. Furthermore, examples of a sensitizing dye include a thiopyrylium salt-based dye, a merocyanine-based dye, a quinoline-based dye, a styryl quinoline-based dye, a ketocoumarin-based dye, a thioxanthene-based dye, a xanthene-based dye, an oxonol-based dye, a cyanine-based dye, a rhodamine-based dye, a pyrylium salt-based dye or the like.

As a specific anthracene compound, dibutoxy anthracene, dipropoxy anthraquinone (Anthracure UVS-1331, 1221 manufactured by Kawasaki Kasei Chemicals Ltd.) or the like is effective.

As a specific thioxanthone compound, thioxanthone, isopropylthioxanthone, diethylthioxanthone, 1-chloro-2-propoxythioxanthone or the like is effective.

When the sensitizer is added, the content thereof is preferably 0.01 to 20 parts by mass, more preferably 0.01 to 10 parts by mass, and particularly preferably 0.1 to 3 parts by mass based on the total amount of the active energy ray-curable resin composition.

The thickness of the adhesive layer is not particularly limited. However, usually, the thickness is preferably 0.01 to 20 μm, more preferably 0.02 to 101 μm, and particularly preferably 0.5 to 5 μm. When the thickness of the adhesive layer is less than 0.01 μm, the insufficient adhering strength may apt to cause peeling. In contrast, when the thickness exceeds 20 μm, the transparency of the adhesive layer may be impaired.

(Other Matters)

The polarizing plate according to this embodiment can be used as an optical film in which the polarizing plate and other optical layers are laminated for practical use. The optical layer is not particularly limited. However, for example, one or two or more optical layers to be used for forming a liquid crystal display device or the like such as a reflector, a semi-transmissive plate, a retardation plate (including a wavelength plate such as ½ or ¼) or a viewing angle compensation film can be used.

The optical film in which the optical layer is laminated on the polarizing plate can also be formed by a method of sequentially and separately laminating the layers in the manufacturing process of the liquid crystal display device or the like. However, the optical film obtained by previous lamination has excellent stability of quality and assembling workability, and can advantageously improve the manufacturing step of the liquid crystal display device or the like. An appropriate bonding means such as a pressure-sensitive adhesive layer can be used for laminating. When the polarizing plate or another optical film is bonded, the optical axes thereof can be set to an appropriate disposing angle according to the objective retardation characteristics or the like.

On the polarizing plate according to this embodiment or the optical film on which at least one polarizing plate is laminated, a pressure-sensitive adhesive layer for bonding the polarizing plate or the optical film to another member such as a liquid crystal cell can also be provided. A pressure-sensitive adhesive forming the pressure-sensitive adhesive layer is not particularly limited. However, for example, a polymer containing an acryl-based polymer, a silicone-based polymer, polyester, polyurethane, polyether, or a fluorine-based or synthetic rubber-based polymer as a base polymer can be appropriately selected for use. Particularly, an acryl-based pressure-sensitive adhesive having excellent optical transparency, exhibiting pressure-sensitive characteristics such as moderate wettability, aggregability and tackiness, and having excellent weatherability and heat resistance or the like is preferably used.

It is preferable that the pressure-sensitive adhesive layer has low moisture absorptivity and excellent heat resistance in view of prevention of a foaming phenomenon or a peeling phenomenon caused by moisture absorption, deterioration of optical characteristics caused by a thermal expansion difference or the like, prevention of warpage of the liquid crystal cell, and formability of the liquid crystal display device having high quality and excellent durability. Examples of such a pressure-sensitive adhesive layer include an acryl-based pressure-sensitive adhesive layer.

For example, the pressure-sensitive adhesive layer may contain a filler made of resins of a natural product or a synthetic product, particularly, an adherability-imparting resin, a glass fiber, a glass bead, a metal powder or other inorganic powders or the like, and an additive agent such as a pigment, a colorant, an antioxidant or an antistatic agent. The pressure-sensitive adhesive layer may be a pressure-sensitive adhesive layer containing fine particles to exhibit optical diffusivity.

The pressure-sensitive adhesive layer can be provided on one surface or both the surfaces of the polarizing plate by an appropriate method. Examples thereof include a method of preparing about 5 to about 60% by weight of a pressure-sensitive adhesive solution obtained by dissolving or dispersing a base polymer or a composition thereof in a solvent made of an appropriate solvent such as toluene, ethyl acetate or water, or a mixture thereof, and directly providing the pressure-sensitive adhesive solution on the polarizing plate or the transparent protective film by an appropriate developing method such as a flow casting method or a coating method, and a method of forming a pressure-sensitive adhesive layer on a separator as described above, and transferring the pressure-sensitive adhesive layer to a polarizing plate or a transparent protective film.

The pressure-sensitive adhesive layer can also be provided as a superposed layer of substances having different compositions or substances of different kinds on one surface or both the surfaces of the polarizing plate or the transparent protective film. When the pressure-sensitive adhesive layer is provided on both the surfaces, a pressure-sensitive adhesive layer of substances having different compositions, kinds or thicknesses can also be provided in the back and front of the polarizing plate. The thickness of the adhesive layer can be appropriately determined according to the purpose of use and the adhering strength. Usually, the thickness is preferably 1 to 40 μm, more preferably 5 to 30 μm, and particularly preferably 10 to 25 μm. When the thickness is thinner than 1 μm, the durability may be reduced. In contrast, when the thickness is thicker than 40 film soaring or peeling is apt to be caused by foaming or the like of the pressure-sensitive adhesive layer, which may cause defective appearance.

The polarizing plate according to this embodiment can be preferably used for various image display devices such as a liquid crystal display device and an organic electro-luminescent device. When the polarizing plate is applied to the liquid crystal display device, the polarizing plate according to this embodiment is disposed so that an optical transmission axis is respectively orthogonal to the front face and the back face of the liquid crystal cell. Thereby, light leakage in a wavelength range of visible light is reduced, to obtain a liquid crystal display device preventing the generation of discoloration in a display screen. The liquid crystal cell is not particularly limited. For example, any type of liquid crystal cell, such as TN type, STN type, π type, VA type and IPS type liquid crystal cell can be applied.

EXAMPLES

Hereinafter, suitable examples of the present invention will be exemplified in detail. However, the scope of the present invention is not limited to materials, mixing amounts and the like described in examples as long as the materials, the mixing amounts and the like are not particularly restrictively described.

Example 1

Production of Polarizing Film

A 80 μm-thick polyvinyl alcohol film was immersed in a water bath of 30° C. so that it was allowed to swell. The polyvinyl alcohol was then immersed in 5% by weight (weight ratio: iodine/potassium iodide=1/10) of an iodine solution (solution temperature: 30° C.) for 0.5 minute for dyeing. The film was then immersed in an aqueous solution (solution temperature: 30° C.) containing 3% by weight of boric acid and 2% by weight of potassium iodide for 0.5 minute. Furthermore, the film was then stretched to six times the initial length while it is immersed in an aqueous solution (solution temperature: 60° C.) containing 4% by weight of boric acid and 3% by weight of potassium iodide for 1 minute. The film was then immersed in 5% by weight of an aqueous potassium iodide solution (solution temperature: 30° C.) for 0.5 minute. Furthermore, the film was dried in an oven of 40° C. for 1 minute to obtain a 30 μm-thick polarizing film. The polarizing film had a moisture percentage of 14% by weight.
<Transparent Protective Film 1>
A 40 μm-thick triacetylcellulose film was used as a transparent protective film, 1. The front retardation of the transparent protective film 1 was 5 nm, and the thickness direction retardation thereof was 45 nm. In order to subject the film to a saponifying treatment, the film was immersed in an aqueous sodium hydroxide solution (concentration: 10% by weight) of 60° C. for 30 seconds. Furthermore, the film was immersed in a water bath twice for 5 seconds. After the film was then washed with water shower for 5 seconds, the film was dried at 70° C. for 2 minutes.
<Transparent Protective Film 2 (Retardation Plate)>
A 40 μm-thick biaxially stretched film made of a norbornene-based resin (trade name: Zeonor manufactured by Zeon Corporation) was used as a transparent protective film 2. The front retardation of the transparent protective film 2 was 55 nm, and the thickness direction retardation thereof was 135 nm.
<Adhesion Improving Treatment>
One surface of the norbornene-based resin film (the surface to be bonded to the polarizing film) was subjected to plasma treatment discharge under the atmospheric pressure. The output at that time was 2.0 kW, and the line speed was 25 m/min.
<Immersing Treatment in Water>
The norbornene-based resin film subjected to plasma treatment discharge was immersed in a water bath (pure water) three times. The water temperature was set to 25° C. Each immersion was performed for 30 seconds.
<Drying Treatment>
The norbornene-based resin film immersed in water was dried using an oven under the conditions of a drying temperature of 60° C. and a drying time of 3 minutes.
<Preparation of Aqueous Adhesive Composition>
39.8 parts by weight (solid content: 2.79 parts by weight) of an adhesive (solid content concentration: about 7% by weight aqueous solution) [trade name "Gohsefimer 2200" manufactured by Nippon Synthetic Chemical Industry Co., Ltd.] containing modified polyvinyl alcohol having an acetoacetyl group as a main component, 0.62 parts by weight (solid content: 0.42 parts by weight) of a cross-linking agent [trade name "Water sol S-695" manufactured by Dainippon Ink and Chemicals, Incorporated] containing a methylol compound as a main component, and pure water were mixed, to prepare 4.0% by weight of an aqueous adhesive composition.
<Production of Polarizing Plate>
A triacetylcellulose film was then bonded to one surface of the polarizing film and a norbornene-based resin film was bonded to the other surface of the polarizing film each with the adhesive composition interposed therebetween by using a small size laminator. The bonding temperature was set to 25° C. The surface of the norbornene-based resin film subjected to the adhesion improving treatment was bonded to the polarizing film. Next, the laminated body after bonding was dried at 70° C. for 5 minutes by using an air circulation type isothermal oven. The thickness of the adhesive layer after drying was set to 150 nm. As described above, a polarizing plate according to Example 1 was produced.

Example 2

In Example 2, a polarizing plate according to Example 2 was produced in the same manner as in Example 1 except that a norbornene-based resin film was subjected to a corona discharge treatment as an adhesion improving treatment, and the norbornene-based resin film was immersed once in a water bath (aqueous solution containing 0.1% by weight of ethanol) for 30 seconds. As for the condition of the corona discharge treatment, the corona output strength was set to 2.0 kW, and the line speed was set to 18 m/min.

Example 3

In Example 3, a polarizing plate according to Example 3 was produced in the same manner as in Example 2 except that, as for the condition of a corona discharge treatment for a norbornene-based resin film, the corona output strength was changed to 0.6 kW; the line speed was changed to 13 m/min; and the water temperature in an immersing treatment was set to 60° C.

Comparative Example 1

In Comparative Example 1, a polarizing plate according to Comparative Example 1 was produced in the same manner as in Example 2 except that a norbornene-based resin film was not immersed in water, and the corona output strength at the time of a corona discharge treatment was changed to 0.6 kW.

Example 4

Preparation of Active Energy Ray-Curable Resin Composition 40 parts by weight of HEAA (hydroxyethyl acrylamide, an N-substituted amide-based monomer represented by the general formula (1), manufactured by Kohj in Co., Ltd.), 30 parts by weight of light acrylate DCP-A (tricyclodecane dimethanol diacrylate, manufactured by Kyoeisha Chemical Co., Ltd.), 30 parts by weight of Wasmer 2MA (N-methoxymethyl acrylamide, an N-substituted amide-based monomer represented by the general formula (1), manufactured by Kasano Kosan Corporation), and 1.5 parts by weight of IRGACURE 819 (bis(2,4,6-trimethylbenzoyl)-phenyl phosphinoxide (photoradical generator), manufactured by Ciba Japan) were mixed. The mixture was stirred at 50° C. for 1 hour, to obtain an active energy ray-curable resin composition.
<Production of Polarizing Plate>
In Example 4, to the adhesion-improving treated surfaces of transparent protective films 1 and 2 were applied the active energy ray-curable resin composition so that the thickness of the active energy ray-curable resin composition was set to 0.8 atm by using an MCD coater (manufactured by Fuji Machinery Co., Ltd.) (cell shape: honeycomb, number of gravure roll lines: 1000 pieces/inch, rotating rate 140%/line speed). The adhesion-improving treated surfaces were treated in the same manner as in Example 3 except that the condition of a corona discharge treatment to a norbornene-based resin film was changed to 2.5 kW, and the water temperature in an immersing treatment was changed to 80° C. The transparent protective films 1 and 2 were bonded to both the surfaces of the same polarizing film as that used in Example 1 by a roller. Then, after the active energy ray-curable resin composition was irradiated with an ultraviolet ray from the bonded transparent protective film sides (both sides) to cure the active energy ray-curable resin composition, the active energy ray-curable resin composition was dried with hot air at 70° C. for 3 minutes, to Produce a polarizing plate having the transparent protective films provided on both the sides of the polarizing film. The bonding line speed was set to 25 m/min, and LED light emitted from an LED light source having peak illuminance at 385 nm was used as the ultraviolet ray. Aicure UD80 (peak illuminance: 3900 mW/cm$^2$, integrated irradiance: 300/mJ/cm$^2$ (wavelength: 380 to 440 nm)) manufactured by Panasonic Electric Works, Ltd. was used as an irradiation device for irradiating the polarizing plate with the LED light.

Example 5

Preparation of Active Energy Ray-Curable Resin Composition 50 parts by weight of HEAA (hydroxyethyl acrylamide, an N-substituted amide-based monomer described in the general formula (1), manufactured by Kohj in Co., Ltd.), 20 parts by weight of Adamantate HA (acrylate having an adamantane skeleton, manufactured by Idemitsu Kosan Co., Ltd.) and 30 parts by weight of Wasmer 2MA (N-methoxymethyl acrylamide, an N-substituted amide-based monomer described in the general formula (1), manufactured by Kasano Kosan Corporation) were mixed. The mixture was stirred at 50° C. for 1 hour, to obtain an active energy ray-curable resin composition.
<Production of Polarizing Plate>
In Example 5, to the adhesion-improving treated surfaces of transparent protective films 1 and 2 were applied the active energy ray-curable resin composition so that the thickness of the active energy ray-curable resin composition was set to 0.8 atm by using an MCD coater (manufactured by Fuji Machinery Co., Ltd.) (cell shape: honeycomb, number of gravure roll lines: 1000 pieces/inch, rotating rate 140%/line speed). The adhesion-improving treated surfaces were treated in the same manner as in Example 3 except that the condition of a corona discharge treatment to a norbornene-based resin film was changed to 1.0 kW, and the water temperature in an immersing treatment was changed to 40° C. The transparent protective films 1 and 2 were bonded to both the surfaces of the same polarizing film as that used in Example 1 by a roller. Then, after the active energy ray-curable resin composition was irradiated with an electron beam from the bonded transparent protective film sides (both sides) to cure the active energy ray-curable resin composition, the active energy ray-curable resin composition was dried with hot air at 70° C. for 3 minutes, to produce a polarizing plate having the transparent protective films provided on both the sides of the polarizing film. The bonding line speed was set to 25 m/min, and an electron beam generated by an electron beam irradiation device manufactured by Eye Electron Beam. Co., Ltd. (accelerating voltage: 250 kV, and irradiation dose: 20 kGy) was used.

Comparative Example 2

In Comparative Example 2, a polarizing plate according to Comparative Example 2 was produced in the same manner as in Example 4 except that a norbornene-based resin film was not immersed in water.
(Peeling Force)
In each of the polarizing plates produced in Examples 1 to 5 and Comparative Examples 1 and 2, the peeling force between the polarizing film and the norbornene-based resin film was measured by a method according to the peeling adhesive strength testing method of JIS K 6854-1. The peeling force was measured after the elapse of 1 hour from the production of the polarizing plate. As the measurement conditions, the temperature was set to 25° C.; the relative humidity Rh was set to 60%; the peeling angle was set to 90°; and the peeling rate was set to 300 mm/min.
(Presence or Absence of Foreign Matter)
In each of the polarizing plates produced in Examples 1 to 5 and Comparative Examples 1 and 2, the presence or absence of the foreign matter was visually observed and counted. The results are shown in Table 1.
(Results)
As can be seen from the following Table 1, in the polarizing plates according to Examples 1 to 3, it was confirmed that the peeling force was 1.5 N/20 mm or 1.8 N/20 mm after the elapse of 1 hour from the production of the polarizing plate, and sufficient tackiness was exhibited. In contrast, in the polarizing plate according to Comparative Example 1, it was found that the peeling force was 0.3 N and the tackiness was insufficient.
In the polarizing plates according to Examples 4 to 5, it was confirmed that the peeling force was 3.9 N/20 mm or 4.6 N/20 mm, and excellent tackiness was exhibited. In contrast, after the adhesive (active energy ray-curable resin composition) was applied to the protective film 2 in the polarizing plate according to Comparative Example 2, the cissing of the adhesive was generated. Air bubbles were generated from the portion in which the cissing was generated after the production of the polarizing plate, which caused defective appearance. The peeling force was a good value of 3.5 N/20 mm. However, partial adhesion failure was generated in the portion in which the cissing was generated.

TABLE 1

| | Adhesion improving treatment | Transparent protective film | Output (kW) | Adhesive | Immersing treatment | Temperature of water | Peeling force (N/20 mm) | Foreign matter (piece) |
|---|---|---|---|---|---|---|---|---|
| Example 1 | Plasma | ZEONOR | 2.0 | Thermal curing of PVA | Water | 25° C. | 1.8 | 3 |
| Example 2 | Corona | ZEONOR | 2.0 | Thermal curing of PVA | Water (containing 0.1% by weight of ethanol) | 25° C. | 1.5 | 5 |
| Example 3 | Corona | ZEONOR | 0.6 | Thermal curing of PVA | Water | 60° C. | 1.5 | 3 |
| Example 4 | Corona | ZEONOR | 2.5 | UV curing type | Water | 80° C. | 3.9 | 2 |
| Example 5 | Corona | ZEONOR | 1.0 | EB curing type | Water | 40° C. | 4.6 | 2 |
| Comparative Example 1 | Corona | ZEONOR | 0.6 | Thermal curing of PVA | N/A | — | 0.3 | 16 |
| Comparative Example 2 | Corona | ZEONOR | 2.5 | UV curing type | N/A | — | 3.5 | 10 |

The invention claimed is:

1. A method for manufacturing a polarizing plate comprising a polarizing film and a transparent protective film provided on at least one surface of the polarizing film, the method comprising the steps of:
subjecting at least a surface of the transparent protective film to be bonded to the polarizing film to an adhesion improving treatment;
bringing water into contact with at least the surface subjected to the adhesion improving treatment; and
laminating the transparent protective film on the polarizing film so that the surface subjected to the adhesion improving treatment and brought into contact with water is bonded to the polarizing film;
wherein the adhesion improving treatment is a corona treatment;
wherein the adhesive layer is formed of a cured product layer obtained by irradiating an active energy ray-curable resin composition with an active energy ray,
wherein the active energy ray-curable resin composition contains a compound having a (meth)acryloyl group, and
wherein the compound having a (meth)acryloyl group is an N-substituted amide-based monomer represented by the following general formula (I):

$$CH_2=C(R^1)-CONH_{2-m}-(X-O-R^2)_m \quad (1)$$

wherein $R^1$ represents a hydrogen atom or a methyl group;
X represents a $-CH_2-$ group or a $-CH_2CH_2-$ group;
$R^2$ represents a $-(CH_2)n-H$ group (n=0, 1 or 2); and m represents 1 or 2.

2. The method for manufacturing a polarizing plate according to claim 1, wherein the transparent protective film is a cycloolefin-based resin film, a polyester resin film, a polyolefin resin film or a (meth)acrylic resin.

3. The method for manufacturing a polarizing plate according to claim 1, wherein the transparent protective film is laminated on the polarizing film with an adhesive layer interposed therebetween.

4. The method for manufacturing a polarizing plate according to claim 1, wherein the temperature of water is in the range of 10° C. to 90° C.

5. A polarizing plate manufactured by the method for manufacturing a polarizing plate according to claim 1.

6. The polarizing plate according to claim 5, wherein the peeling force between the polarizing film and the transparent protective film is 1 N/20 mm or more.

7. An optical film comprising the polarizing plate according to claim 5.

8. An image display device comprising the polarizing plate according to claim 5 or the optical film according to claim 7.

* * * * *